United States Patent Office 3,270,276
Patented August 30, 1966

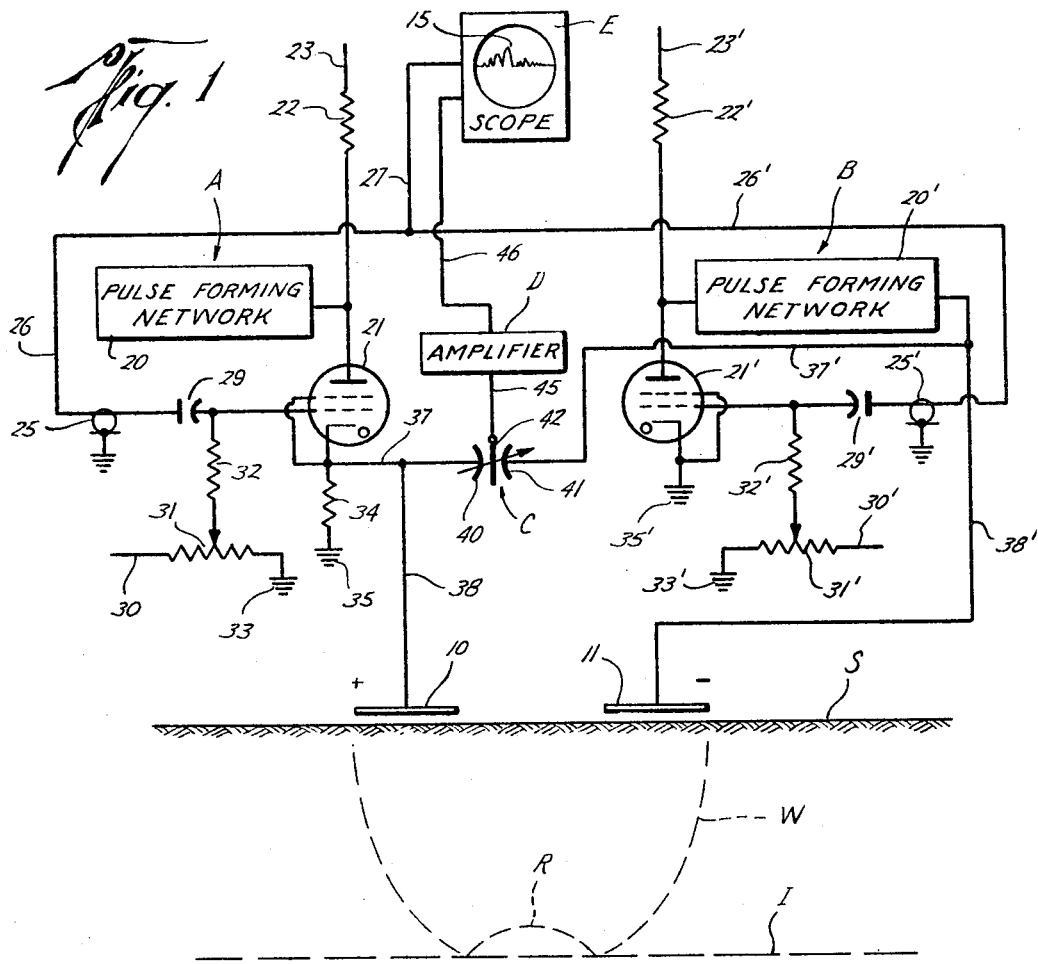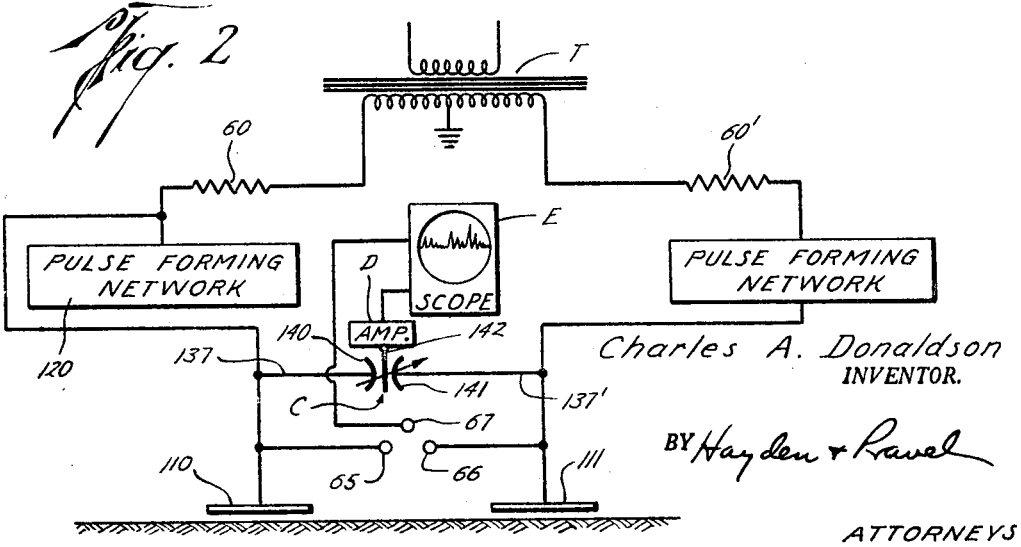

3,270,276
GEOPHYSICAL APPARATUS FOR INDICATING STRATA BENEATH THE EARTH'S SURFACE INCLUDING MEANS FOR PREVENTING TRANSIENTS FROM REACHING THE INDICATING MEANS
Charles A. Donaldson, Arlington, Tex., assignor of fifty percent to J. D. Cavaness, Grapevine, Tex.
Continuation of application Ser. No. 166,077, Jan. 15, 1962. This application Apr. 13, 1965, Ser. No. 449,385
6 Claims. (Cl. 324—6)

This invention relates to new and useful improvements in geophysical apparatus.

This is a continuation of application Serial No. 166,077 filed January 15, 1962, now abandoned.

In my prior Patent No. 2,657,380, an apparatus for geophysical prospecting is disclosed. Such apparatus has been extensively used and has been of considerable value in geophysical work. However, it has been found that the high voltage pulse generator of such apparatus causes transients, i.e., unintended voltages, to be fed into the wiring of the electrical circuit where they are picked up by the amplifier and appear as "pips" or deflections on the oscilloscope with the pips or deflections caused by pulse reflections from underground surfaces. The pips on the oscilloscope caused by such transients are often difficult, if not impossible, to distinguish from the pips produced by the actual pulse reflections, and therefore indefinite and faulty readings may occur, particularly with inexperienced users or operators of such apparatus.

It is an object of the present invention to provide an apparatus which is an improvement on the apparatus of said U.S. Patent No. 2,657,380, while retaining all of the advantages of the apparatus of said patent.

An important object of this invention is to provide a new and improved apparatus for geophysical prospecting of the type disclosed in U.S. Patent No. 2,657,380 wherein pulses are generated, are reflected back from surfaces underground, and are indicated on an oscilloscope or the like; said new and improved apparatus being so constructed that transients in the wiring are eliminated to thereby eliminate unintended pips or deflections on the oscilloscope.

A particular object of this invention is to provide a new and improved geophysical prospecting apparatus wherein the output voltage pulses are in push-pull, but the return pulse reflections from underground surfaces reach the apparatus in push-push, and wherein any transients are cancelled or balanced out before reaching the oscilloscope.

A further object of this invention is to provide a new and improved geophysical prospecting apparatus wherein output voltage pulses are transmitted into the earth by a pair of radiating plates which are energized by out-of-phase signals, but in which the return deflections from underground surfaces return to the radiating plates in a common wave front which arrives simultaneously at such plates, and wherein any transients created during formation of the transmitted pulses are cancelled against one another before reaching the oscilloscope.

Yet, a further object of the present invention is to provide a new and improved geophysical prospecting apparatus utilizing a pair of spaced radiating plates which are energized by out-of-phase signals and which plates are time shared to serve as means for receiving return pulse reflections from underground surfaces.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a schematic view illustrating one form of the geophysical apparatus of the present invention; and FIG. 2 is another form of the geophysical apparatus of the present invention.

In the drawings, the letter A designates generally the means for generating voltage pulses to a pulse plate or electrode plate 10. The pulses generated by the means A are preferably positive (push). The geophysical apparatus of the present invention also has another means B for generating a voltage pulse which is preferably negative (pull) on the pulse plate or electrode plate 11. The positive and the negative pulses from the generating means A and B are balanced out with a capacitor C or any other equivalent means for accomplishing such purpose. Thus, transients are prevented from being transmitted to an amplifier D and an oscilloscope E which are electrically connected to the capacitor C as illustrated in the drawings. Briefly, in operation, the apparatus provides for the imparting of a pulse or radio wave W which is transmitted from the plates 10 and 11 at the earth's surface S so as to pass underground until reaching a reflecting interface I. The wave W is reflected back from the interface or interfaces I as indicated at R and reaches the plates 10 and 11 as positive pulses (push-push), which reflected pulses are transmitted through the capacitor C and the amplifier D to the oscilloscope E. Each of the reflected pulses R produces a pip such as schematically illustrated at 15 on the scope E (FIG. 1).

Considering the invention more in detail, and particularly the form illustrated in FIG. 1, the pulse generating means A includes a standard pulse forming network 20 which is schematically illustrated and which is connected to a thyratron tube 21 and also a resistance 22 and a source of high voltage (not shown) connected to the lead or wire 23. A trigger input 25 of conventional form which is preferably connected through the scope E by means of wire 26 and wire 27 is used for actuating the tube 21 to cause it to break down and then transmit the pulse from the pulse forming network 20. A condenser 29 is connected between the trigger 25 and the tube 21. A negative bias is also connected between the trigger 25 and the tube 21 at line or wire 30, through a variable resistance 31 and another resistance 32. The resistance 31 is grounded as indicated at 33. Likewise, the tube 21 is grounded through a resistance 34 at the point indicated by the numeral 35. The plate 10 is an electrode plate which is connected to the tube 21 through wire 37 and wire 38. The extent of the wire 38 may of course be varied so that the plate 10 may be positioned adjacent to the earth's surface S in use. The wire 37 is also connected to a stator 40 of the balance capacitor C.

The pulse generating apparatus B is similar to the pulse generating apparatus A, except that the apparatus or means B generate negative pulses, which are of course of an opposite polarity to those generated by the apparatus or means A. The means B has a pulse forming network 20' to which is connected the electrode plate 11 by means of a lead wire 38'. The pulse forming network 20' is of conventional construction and is well known in the art and it is connected to a thyratron tube 21', a resistance 22' and a source of high voltage (not shown) which is connected to the wire 23'. A trigger input 25' which is preferably connected to the oscilloscope E through electrical wire 26' and wire 27 is used to actuate the system or means B for causing the tube 21' to break down so that the pulses formed in the network 20' are transmitted to the plate 11. The means B also has a condensor 29' connected between the trigger 25' and the tube 21'. Also, there is a negative bias 30' connected between the tube 21' and the trigger 25' through a variable resistance 31' and a resistance 32'. The variable resistance 31' is grounded as indicated at 33'. Also, the thyratron tube 21' is grounded as indicated at 35'.

The pulse forming network is connected through an electrical wire 37' to a stator 41 of the balanced capacitor C. Pulse forming networks are discussed in the textbook, "Pulse Generators," which is volume 5, 1948, Radiation Laboratory Series, and which discloses by way of example a pulse forming network on page 477.

In addition to the stators 40 and 41, the balance capacitor has a rotor or movable member 42 between such stators 40 and 41 for balancing out the positive and negative pulses from the pulse generating apparatus A and B, respectively.

The rotor 42 is connected through an electrical wire 45 to the amplifier D and then through another electrical wire 46 to the oscilloscope E. The balancing out of the negative and positive pulses generated by the generating means A and B does not, however, preclude or prevent the transmission of the reflected positive pulses generated by the simultaneous arrival of the reflected wave R at the plates 10 and 11 which pulses are detected and transmitted through the capacitor C to the amplifier D and then to the scope E.

In the use of the form of the invention illustrated in FIG. 1, the high voltage is applied to the wires 23 and 23' and the pulse forming networks 20 and 20' generate the positive and negative pulses which are transmitted to the plates 10 and 11, respectively, when the triggers 25 and 25' are actuated. It will be appreciated that the triggers 25 and 25' may be combined as a single trigger mechanism or circuit connected to or within the scope E, in any suitable manner. The trigger signals cause a breakdown in the tubes 21 and 21' which conduct heavily because of the operation of the pulse forming networks 20 and 20', respectively, to form pulses which are conducted to the plates 10 and 11 out of phase with respect to one another. The positioning of the plates 10 and 11 adjacent the earth's surface S (see FIG. 1) for transmitting or radiating such generated pulses underground propagates the wave front W to a surface or interface I located underground and creates a reflected wave front as exemplified by the wave front R. There may, of course, be interfaces or surfaces I at various elevations underground, but only one of such interfaces I is illustrated. The radiated wave front is spherical in shape, as in the case with all radiation wave fronts, and may radiate for several thousand feet through the earth's subsurface to the interface I which forms the reflected wave front R. Reflection of the wave front W directs the reflected wave front R, which is also a spherical wave front, to the surface of the ground as shown in the drawings. It will be appreciated from elementary physics that the reflected wave front W has a virtual source which appears to be a distance below the interface I equal to the distance from the interface I to the earth's surface. Since the distance from the virtual or apparent source of the reflected spherical wave front R to the plates 10 and 11 is many hundreds or even thousands times greater than the spacing between the plates, the reflected wave front R arrives at the plates 10 and 11 simultaneously to provide pulses which reinforce one another and are in phase with one another, or stated differently, the pulses are push-push. Since the apparatus is normally mounted in a vehicle such as a truck in the conventional manner, the distance between the plates is normally from about one foot to about eight feet; however, the invention is not limited to such distance or spacing between the plates 10 and 11, although there would be no reason to space the plates at greater distances.

The reflected pulses or waves R which are reflected back from each of the interfaces I are picked up by the plates 10 and 11 and are transmitted back through the capacitor C and the amplifier D to the scope E where they are indicated as pips or deflections in the sweep line on the oscilloscope E, in the known manner. Thus, it can be seen that with the present invention, transients, i.e., voltages which are undesirable, are obtained out of phase and cancelled against one another and are therefore prevented from being transmitted to the indicator or scope E, whereas the reflected pulses are properly indicated as pips or deflections on the scope E on detection by the plates 10 and 11 which are time-shared with means for forming the transmitted pulses.

The indicating device E which is connected to the plates is effectively isolated from the plates 10 and 11 during pulse formation by operation of the balance capacitor C which is adjusted to cancel pulses which are 180° out of phase. Thus, during transmission, no indications of transients are produced on the indicating means E.

FIG. 2 of the drawings illustrates a second form of the invention which likewise eliminates the transmission of transients to the oscilloscope. The form of the invention shown in FIG. 2 includes pulse forming networks 120 and 120' which are of conventional construction and correspond with the pulse forming networks 20 and 20' of FIG. 1. A source of high voltage is provided through a high tension transformer T to the pulse forming networks 120 and 120'. Suitable resistances 60 and 60' are connected intermediate the transformer T and the pulse forming networks 120 and 120', respectively. The pulse forming network 120 is connected to electrode plate 110, while the pulse forming network 120' is connected to the electrode plate 111. With the apparatus of FIG. 2, there are two pulses generated per cycle and each pulse plate 110 and 111 is alternately the positive plate and the negative plate.

In this connection, a spark gap is provided between spark gap electrodes 65 and 66. The spark between the electrodes 65 and 66 is triggered by a spark gap trigger electrode 67 connected in the known manner with the oscilloscope E.

The plates 110 and 111 are connected to the capacitor C which is used to balance out the positive and negative voltage pulses from the networks 120 and 120', as in the form of the invention shown in FIG. 1. Thus, the network 120 is connected to a stator 140 through a lead or wire 137 while the network 120' is connected to a stator 141 of the capacitor C through a wire 137'. The rotor 142 of the balance capacitor C is turned relative to the stators 140 and 141 to balance out the positive and negative voltage pulses from the pulse forming networks 120 and 120'. Thus, only the positive or push-push pulses which are reflected from interfaces or underground surfaces are received through the capacitor C and transmitted to the scope E through an amplifier D.

In the operation of the form of the invention shown in FIG. 2, the spark at the gap between the electrodes 65 and 66 is generated or actuated by the trigger electrode 67 connected with the scope E, when it is desired to get a reading on the scope E. The pulse forming networks 120 and 120' provide the voltage pulses to the plates 110 and 111, which, are alternately positive and negative, as previously explained. Additionally, as pointed out above, the positive and negative pulses from the networks 120 and 120' are balanced out by the adjustment of the rotor 142 of the balance capacitor C so that only the reflected pulses reach the oscilloscope E.

It will be apparent to those skilled in the art that various modifications and changes in the electrical circuits may be made within the scope of the present invention. Broadly, the invention contemplates the elimination of pips or deflections on the oscilloscope from transients or undesirable voltages while still obtaining the pips on the oscilloscope from the reflected pulses.

The foregoing disclosure and description of the invention is illustrative and explanatory thereof and various changes in the size, shape and materials, as well as in

What is claimed is:
1. A geophysical apparatus, comprising:
   (a) a first means for generating negative pulses with respect to ground,
   (b) a second means for generating positive pulses with respect to ground,
   (c) means connected to said first and second means for simultaneously directing said negative pulses and said positive pulses to underground surfaces for obtaining pulse reflections therefrom,
   (d) plate means for picking up said pulse reflections,
   (e) means electrically connected to said plate means for forming indications in response to said pulse reflections which are picked up and which represent geophysical strata beneath the earth's surface, and
   (f) means connected to the indicator means for balancing out the generated negative and positive pulses to avoid indicating any transients arising from the generated pulses in the indications which represent geophysical strata beneath the earth's surface as indicated on said indicator means.

2. A geophysical apparatus, comprising:
   (a) a pair of electrode plates adapted to be positioned adjacent the earth's surface,
   (b) means electrically connected to said plates for simultaneously generating voltage pulses of opposite polarity on said plates,
   (c) said pulses on said plates creating pulses which are transmitted from the earth's surface to various underground surfaces and are reflected back to said plates,
   (d) an oscilloscope connected to said plates for receiving and visually indicating the reflected pulses which represent geophysical strata beneath the earth's surface, and
   (e) means connected to said oscilloscope for balancing out the generated voltage pulses to prevent transients arising therefrom from reaching said oscilloscope.

3. The structure set forth in claim 2, including:
   (a) an amplifier connected to and between said oscilloscope and said means for balancing out the generated voltage pulses.

4. The structure set forth in claim 2, wherein:
   (a) said means for balancing out the generated voltages includes a variable condenser having a stator connected to each of said means for generating voltage pulses, and
   (b) a rotor connected to said oscilloscope whereby movement of the rotor balances out the generated positive and negative pulses to prevent them from reaching said oscilloscope.

5. A geophysical apparatus, comprising:
   (a) a pair of electrode plates adapted to be positioned adjacent to the earth's surface,
   (b) means electrically connected to one of said plates for generating a voltage pulse on said plate,
   (c) means electrically connected to the other of said plates for generating a voltage pulse on said other plate which is 180° out of phase with respect to pulses on said one plate,
   (d) said plates radiating a wave front transmitted from the earth's surface to various underground surfaces for reflection therefrom back to said plates,
   (e) an indicating device connected to said plates for receiving and indicating the reflected pulses which represent geophysical strata beneath the earth's surface, and
   (f) means connected to said indicating means for isolating same from the effect of transients of pulses applied to said plates to prevent indication of transients by said indicating means.

6. In a geophysical apparatus for forming and radiating a wave front into the earth for reflection by underground surfaces and reception of the reflected wave front, said apparatus including a pulse generator connected to aid in forming the wave front, the improvement comprising:
   (a) second pulse generating means for forming a pulse 180° out of phase with the pulse of the pulse generator,
   (b) a pair of radiating means connected to the pulse generator and said second pulse generating means for radiating the wave front formed by said pulses into the earth,
   (c) indicating means connected to said radiating means for receiving the wave front reflected from the underground surface and representing geophysical strata beneath the earth's surface, and
   (d) third means connected to said indicating means for maintaining no indication thereon during pulses radiated by said radiating means, said third means permitting said indicating means to maintain an indication during reception of the reflected wave front.

No references cited.

WALTER L. CARLSON, *Primary Examiner.*

G. R. STRECKER, *Assistant Examiner.*